(12) United States Patent
Liang et al.

(10) Patent No.: US 7,315,304 B2
(45) Date of Patent: Jan. 1, 2008

(54) MULTIPLE VOLUME EXPLORATION SYSTEM AND METHOD

(75) Inventors: Cheng-Chung Liang, West Windsor, NJ (US); Jian-Zhong Qian, Princeton Junction, NJ (US); Guo-Qing Wei, Plainsboro, NJ (US); Li Fan, Belle Mead, NJ (US); Xiaolan Zeng, Princeton, NJ (US)

(73) Assignee: Edda Technology, Inc., Princeton Junction, NJ (US)

( * ) Notice: Subject to any disclaimer, the term of this patent is extended or adjusted under 35 U.S.C. 154(b) by 112 days.

(21) Appl. No.: 11/105,638

(22) Filed: Apr. 14, 2005

(65) Prior Publication Data

US 2005/0251038 A1 Nov. 10, 2005

Related U.S. Application Data

(60) Provisional application No. 60/562,262, filed on Apr. 15, 2004.

(51) Int. Cl.
*G06T 15/50* (2006.01)

(52) U.S. Cl. ............... 345/426; 345/419; 345/424; 600/437

(58) Field of Classification Search ............... 345/419, 345/424, 427, 582, 592, 650, 660, 664, 426; 600/437
See application file for complete search history.

(56) References Cited

U.S. PATENT DOCUMENTS 6,100,862 A * 8/2000 Sullivan ................... 345/88
2003/0234781 A1* 12/2003 Laidlaw et al. ............. 345/419
2005/0228250 A1* 10/2005 Bitter et al. ................ 600/407

OTHER PUBLICATIONS

Search Report dated Apr. 24, 2007.

* cited by examiner

*Primary Examiner*—Kimbinh T. Nguyen
(74) *Attorney, Agent, or Firm*—McDermott Will & Emery LLP (57) ABSTRACT

Method and system for multiple volume exploration is disclosed. A first 3D volume is rendered in a first region. One or representations are displayed in a second region, where each representation signifies a stack of 2D images. A first stack represents one or more 2D images of cross sections of a certain orientation from the first 3D volume. Each of the other stacks includes one or more 2D images of cross sections of the same orientation from a 3D volume related to the first 3D volume.

80 Claims, 10 Drawing Sheets

MULTIPLE VOLUME EXPLORATION SYSTEM AND METHOD

The present invention claims priority of provisional patent application No. 60/562,262 filed Apr. 15, 2004, the contents of which are incorporated herein in their entirety.

BACKGROUND OF THE INVENTION

1. Field of the Invention

The present invention relates generally to system and method for data exploration and systems incorporating the present invention. Specifically, the present invention relates to a method and system for visualizing and exploring 3D or 4D volumetric data and systems incorporating the present invention.

2. Description of Related Art

Three-dimensional (3D) imaging data are often obtained in the form of slices. Such slices can be examined to peek through the dense 3D textural space. For example, in medical imaging, one can observe a cross section of a body by examining a corresponding image slice. In addition, volume scans of multiple phases and/or time-sequence volumes have become increasingly popular in studying structural dynamics. The availability of such tremendous amounts of data makes it very difficult if not impossible for interested parties to make the best use of such information. Extracting useful information from data in a higher dimensional space through examining individual 2D slices often requires special skills. Tools have been developed to assist exploration of 3D or 4D data. Although modem volume rendering techniques have provided much improvement, no tool has offered an intuitive and easy way to assist a user to explore 3D/4D data by effectively navigating through slices in a 3D or 4D space.

Medicine is a field where 3D or even higher dimensional data is commonly used. Some modem medical software packages are capable of presenting a plurality of viewing windows for 2D images and permitting a user to view slices from an arbitrary angle. Other more advanced systems support a 3D view window where 3D objects can be rendered. However, one can only visualize 3D data in such a 3D window without being able to edit the 3D data. In addition, such systems do not provide correlation between presented 2D slices and 3D data. As a consequence, a user often needs to switch back and forth between a 3D object and 2D views, which may cause interruptions not only to the user's attention but also the underlying workflow. In addition, when multiple volumes are present, it is even more difficult, with conventional tools, to explore 4D data in an intuitive and coherent manner. Furthermore, in the medical domain, it is sometimes important to fuse information contained in multiple volumes in order to detect any anomaly. For example, the intensity pattern in an image or volume of a liver lesion usually changes over time. To reach a correct diagnosis, it is crucial to be able to observe and correlate such intensity changes across different volumes. It may also be important to fuse information from different volumes to derive integrated evidence to assist diagnostic decision making. Unfortunately, conventional systems do not provide tools that enable a user to do so.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present invention relates to a method and system for 3D volume exploration. A Method and system for Multiple Volume Exploration (MVE) are disclosed herein that enable coordinated 3D data visualization and manipulation. A graphical user interface is described that provides the capability of hierarchical layout expansion with a visual data arrangement that allows a user to examine multiple 3D volumes and corresponding 2D cross sectional data in a dynamic and coherent manner. A 3D control panel for controlling data visualization and manipulation is embedded directly in a 3D space where 3D data is visualized. Information from multiple data sets can be fused via a visual approach through a plurality of visual fusion control widgets.

Figure 1:
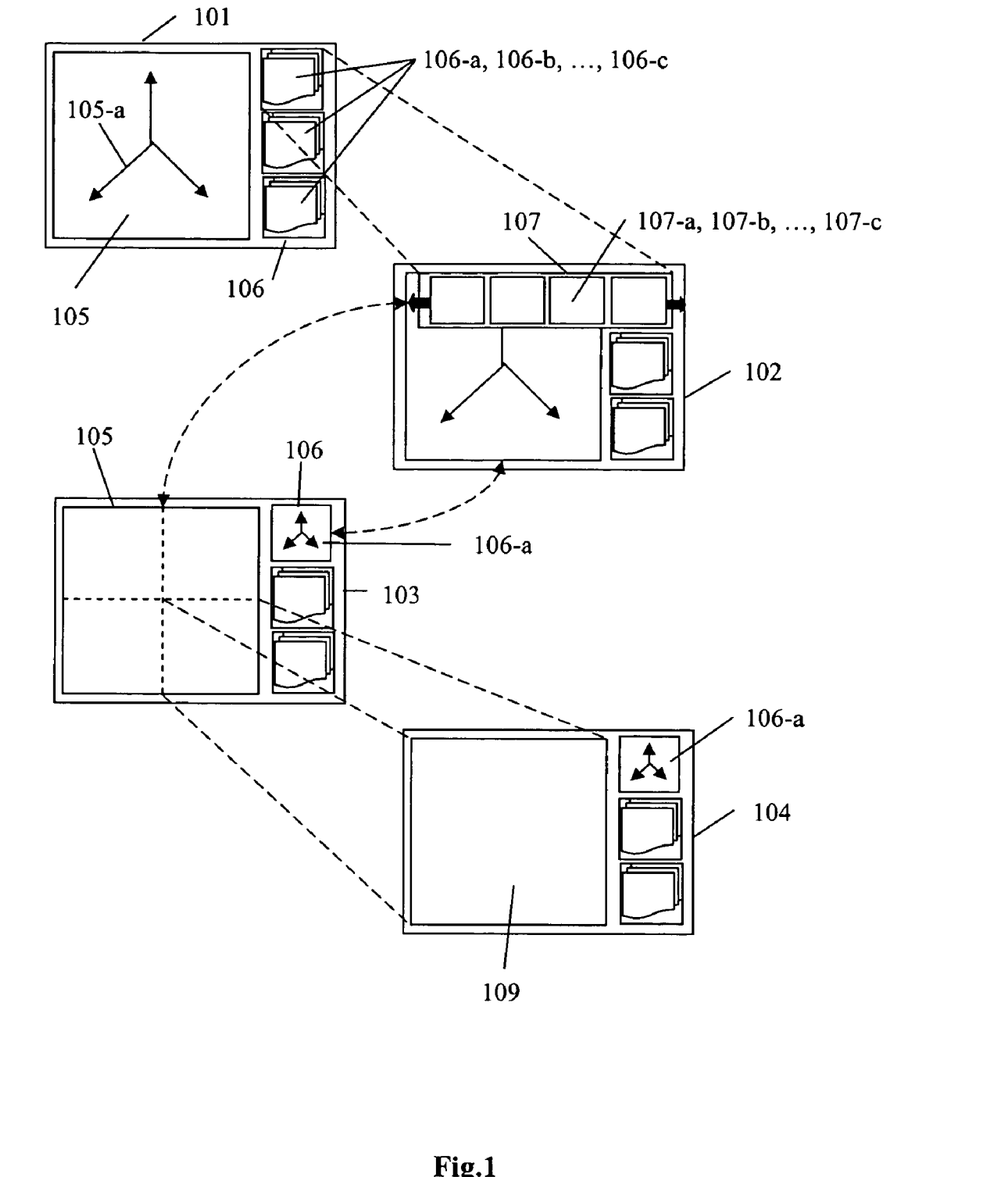
FIG. 1 describes exemplary schematics of a hierarchical layout expansion, according to an embodiment of the present invention.

FIG. 1 describes exemplary schematics of hierarchical layout expansion, according to an embodiment of the present invention. In this exemplary scheme, four different expansion layout arrangements are illustrated. A 2D display area 101 shows an expansion arrangement. In this arrangement, a 3D volume is rendered in a display region 105. In a separate display region 106, one or more iconic representations, 106-*a*, 106-*b*, . . . , 106-*c*, are displayed. Each of the iconic representations signifies a stack of 2D cross sectional images. A cross sectional 2D image refers to an image taken from a cross section of a 3D volume at a specified 3D location from a particular perspective. The 3D volume rendered in 105 may have other correlated counterpart 3D volumes such as a time sequence or 3D data taken at different phases. Each stack comprises cross section images taken from one of such multiple 3D volumes viewed from a particular perspective. For example, a stack may include all horizontal cross sections of a 3D volume. A different stack may then comprise corresponding 2D horizontal cross sections from another associated 3D volume. A user may specify a particular perspective used to form these 2D stacks in the display region 105 where one of the 3D volumes in a volume sequence is rendered. Details related to how a user may specify a particular perspective are discussed below with reference to FIG. 2.

Figure 2:
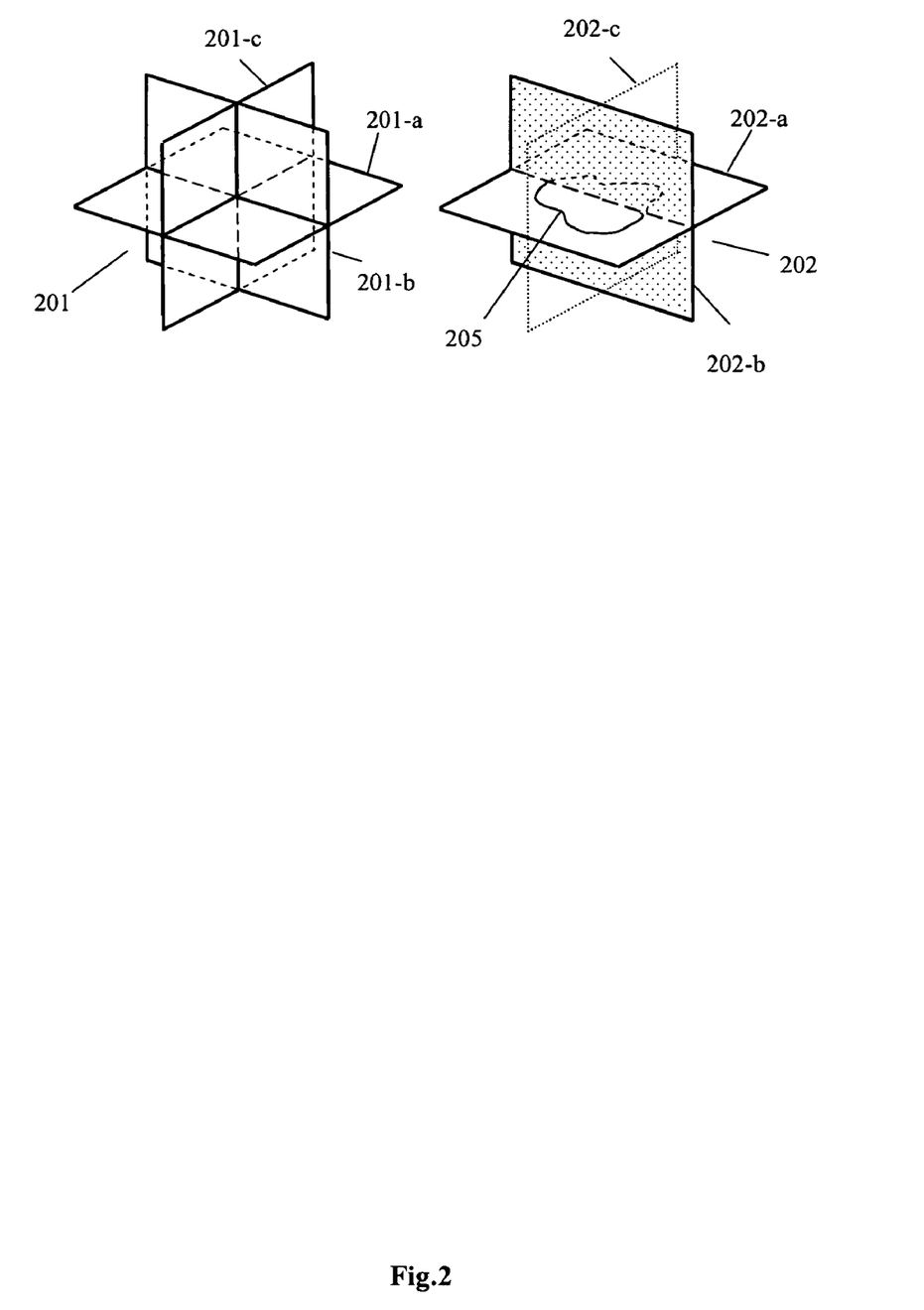
FIG. 2 shows an exemplary 3D space with planes that can be set in different viewing modes, according to an embodiment of the present invention.

FIG. 2 shows an exemplary 3D space 201 with planes of certain orientations that can be set in different viewing modes in order to visualize a portion of 3D data, according to an embodiment of the present invention. In the exemplary 3D space 201, one or more planes (each in a certain orientation) may be present that can be used to slice through a 3D volume to obtain a 2D view of a cross section. There can be as many planes as needed and each plane can be placed in an arbitrary orientation. In the illustrated embodiment, three orthogonal planes 201-a, 201-b, and 201-c are shown. Each of these 3D planes slices through the 3D space 201 from a certain perspective. For example, the plane 201-a cuts the 3D space 201 horizontally. The plane 201-b cuts the 3D space 201 at a certain depth. The plane 201-c cuts the 3D space 201 into left and right portions.

In some embodiments, a user may be provided with means to control where each plane is placed in the 3D space 201. A user may also be provided with means to move all three planes at the same time. For example, a user may click on a particular location on a 2D cross section image so that three orthogonal planes are automatically shifted to the location as their new origin. The click may be performed on either a cross sectional view on one of the planes or on a 2D cross sectional image from one stack of the 2D images. When more than one plane is present, a user may also select a focal plane by clicking on the desired plane. The user may also move or rotate the plane to form a desired perspective.

Means may also be provided so that a user can set an appearance mode for a plane. In one embodiment, such appearance modes may include an opaque mode, a transparent mode, and an invisible mode. As shown in FIG. 2, all three planes in the 3D space 201 are in an opaque mode. In another exemplary 3D space 202 in FIG. 2, a plane 202-a is in an opaque mode, a plane 202-b is in a transparent mode, and a plane 202-c is in an invisible mode. When a plane is in an opaque mode, the cross section (e.g., 205) yielded by the slicing plane may be visualized in gray scale intensities. When a plane is in a transparent mode (e.g., plane 202-b), it may allow see-through visualization, yielding a transparent image. Such see-through view may be implemented with a color tone or a texture, as plane 202-b shown in FIG. 2. When a plane is in an invisible mode, no image is visible.

The appearance mode of a plane may be set or changed when needed. In some embodiments, each plane may be associated with an inherent mode setting or changing mechanism. In this case, a user may click on the plane and each click may represent a different mode so that a desired mode may be set when the click reaches the desired mode setting. The inherent mode changing mechanism may also be embedded within the area where a cross section of the 3D volume is present. In this case, a user may click anywhere in the area to change the mode and the effect of the change may be made immediately visible as applied to the cross section on the underlying plane. The inherent mode changing mechanism may also be embedded in a 3D control panel (as described below) associated with the underlying plane.

Different planes may be set in different modes independently to facilitate appropriate viewing of data. For example, when one plane is in opaque view and another in a transparent mode, the part of an image on the opaque plane that is behind the transparent plane is visible. When an opaque plane is moved around in a 3D space, it cuts through the 3D volume from different angles, yielding different cross sections. By appropriately placing a plane and setting its mode, one can flexibly view different cross sections of a 3D volume.

Cross section images contained in a stack change when a slicing plane moves. In some embodiments, the top 2D image in a stack corresponding to the rendered 3D volume is the cross section yielded by the slicing plane. Top images of other stacks from 3D volumes associated with the rendered 3D volume are cross sectional images at the same location as the cross section yielded by the slicing plane.

Under the arrangement shown in the display area 101, data that are visualized in region 105 and region 106 are correlated. When one changes (e.g., a plane in region 105 slices at a different location), others (e.g., stacks of cross section images from different volumes) change accordingly. When there are more volumes in a sequence than the number of sub-regions in 106, a scroll mechanism may be provided in the display area 101 to enable visualization of stacks for all volumes.

A display area 102 in FIG. 1 illustrates a different exemplary hierarchical layout expansion arrangement in which images in a selected stack can be expanded in full view in a display region 107. The display region 107 may overlap with other display regions such as the display region 105 and the display 106. 2D images in the selected stack may be displayed in different sub-regions, e.g., 107-a, 107-b, . . . , 107-c, of region 107. The order in which 2D cross section images in the selected stack are visualized may be determined, for example, based on the order of cross sections in an underlying 3D volume. The size of each of the sub-regions where a single cross section is visualized may be determined based on different criteria. For instance, it may be determined based on the number of cross sections contained in the underlying volume. It may also be determined based on other criteria. For example, the size of a sub-region containing the representation of the selected stack may be used as a default size. When the number of sub-regions is smaller than the number of cross sections in a stack given a particular sub-region size, a means may be provided that allows a user to scroll (e.g., in the direction from left to right) through all the 2D images.

In some embodiments, when a 2D image in the selected stack is visualized in an area where the region 107 overlaps with other display region(s), a user may be permitted to cycle among different modes of visualization. For example, when a sub-region for visualizing a 2D cross section image overlaps a region for rendering a 3D volume (as shown in region 102), means may be provided that permits a user to toggle between a front view and a back view on either of the data sets (3D volume or a cross section image).

A display area 103 in FIG. 1 shows another exemplary hierarchical layout expansion arrangement, according to an embodiment of the present invention. In this exemplary arrangement, the display region 105 is used to visualize a plurality of 2D cross sectional images from a selected stack and a 3D volume is rendered in a shrinking form in one of the sub-regions (e.g., sub-region 106-a) in the display region 106. In this exemplary arrangement, there are four selected cross sectional images displayed occupying four quadrants of the display region 105. Other configurations may also be adopted or selected at a user's choice. For instance, 16 cross section images may be visualized simultaneously in the same display region. Similarly, means may be provided to allow a user to scroll in order to view different cross sections. Such a scroll mechanism may allow top-down scrolling, left-right scrolling, or a combination thereof. One special case is when a single cross section image is visualized in the entire display region 105, as shown in a display area 104 in FIG. 1. Means may be provided to allow a user to select one of the cross sections to be displayed in a full view in the display region 105.

Other arrangements are also possible to effectuate such coordinated 4D, 3D, and 2D data visualization and manipulation. A user may switch among different expansion arrangements through, for example, some on-screen controls (not shown). Under the visualization scheme described herein, a user can navigate through data in a 4D space, view the interior of a 3D volume directly on a 3D view rather than in a separate 2D space, and examine coordinated interior portions of other 3D volumes. The spatial relationship among different pieces of data is embedded in the visual presentation that enables a user to explore high dimensional data with efficiency and avoid the need to mentally reconstruct a 3D view on the fly.

The data visualization scheme as described herein provides similar support for 3D objects (distinguished from 3D volumes). A segmentation algorithm often yields 3D binary objects, or a volume-of-interest (VOI). When such a 3D binary object/VOI is visualized together with three orthogonal planes, contours of cross sections of the binary 3D object/VOI may be visualized on both the slicing planes as well as in the associated stack of 2D cross sectional images.

Figure 3:
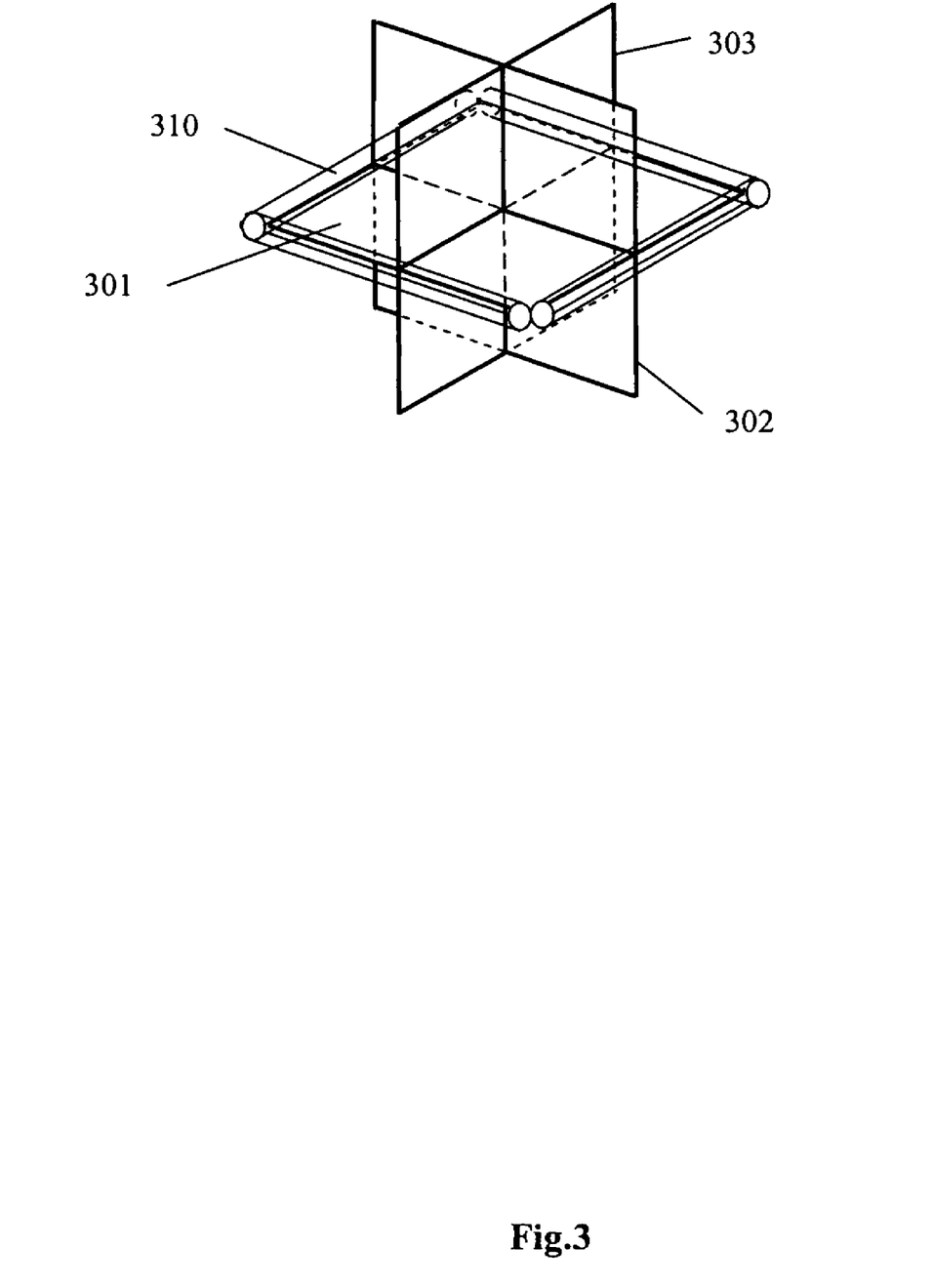
FIG. 3 shows an exemplary 3D control panel in relation to 3D planes in a 3D space, according to an embodiment of the present invention.

To further facilitate data manipulation, a 3D control panel is provided, through which a user may exercise control over data visualization and manipulation directly in a 3D space. In some embodiments, each slicing plane in the 3D rendering region 105 may have an embedded 3D control panel. FIG. 3 shows an exemplary 3D control panel 310 in a 3D space 300, according to an embodiment of the present invention. In this exemplary configuration, three planes, 301, 302, and 303, are shown that slice through the 3D space 300. A 3D control panel 310 embedded with the plane 301 is illustrated.

In some embodiments, the 3D control panel 310 may be rendered around the border of a plane. The 3D control panel 310 may be a three dimensional object and its shape may change when needed when it is embedded with a plane. For example, when a plane has four sides, an embedded 3D control panel may also have four sides in its overall shape. If a plane has a round border, the 3D control panel may have a round shape as its overall shape. Different portions of the 3D control panel 310 may have a different shape. For instance, while a 3D control panel has an overall shape of a rectangle, different sides may have different shapes: one side of the 3D control panel may be rendered as a 3D cylinder with round cross sections and the other as a 3D squared tube with square shaped cross sections. When there is more than one 3D control panel in the 3D rendering region 105 (embedded with different planes), each may be color and/or texture coded. Each control panel may be embedded with a plane in such a manner that its panel is visible from an arbitrary viewing angle.

In some embodiments, the 3D control panel 310 may be moved around in the 3D space in which it is rendered. This movement may include a translation, a rotation, scale, or any combination thereof. The 3D control panel 310 may be moved independently of the plane it surrounds. Alternatively, the 3D control panel 310 may also be embedded in such a manner so that the 3D control panel moves with the plane (e.g., the plane 301 in FIG. 3) it surrounds. Means may be provided to allow a user to move a plane with which a 3D control panel is embedded by moving the 3D control panel. Alternatively, a 3D control panel may be moved by moving the embedding plane.

Figure 4:
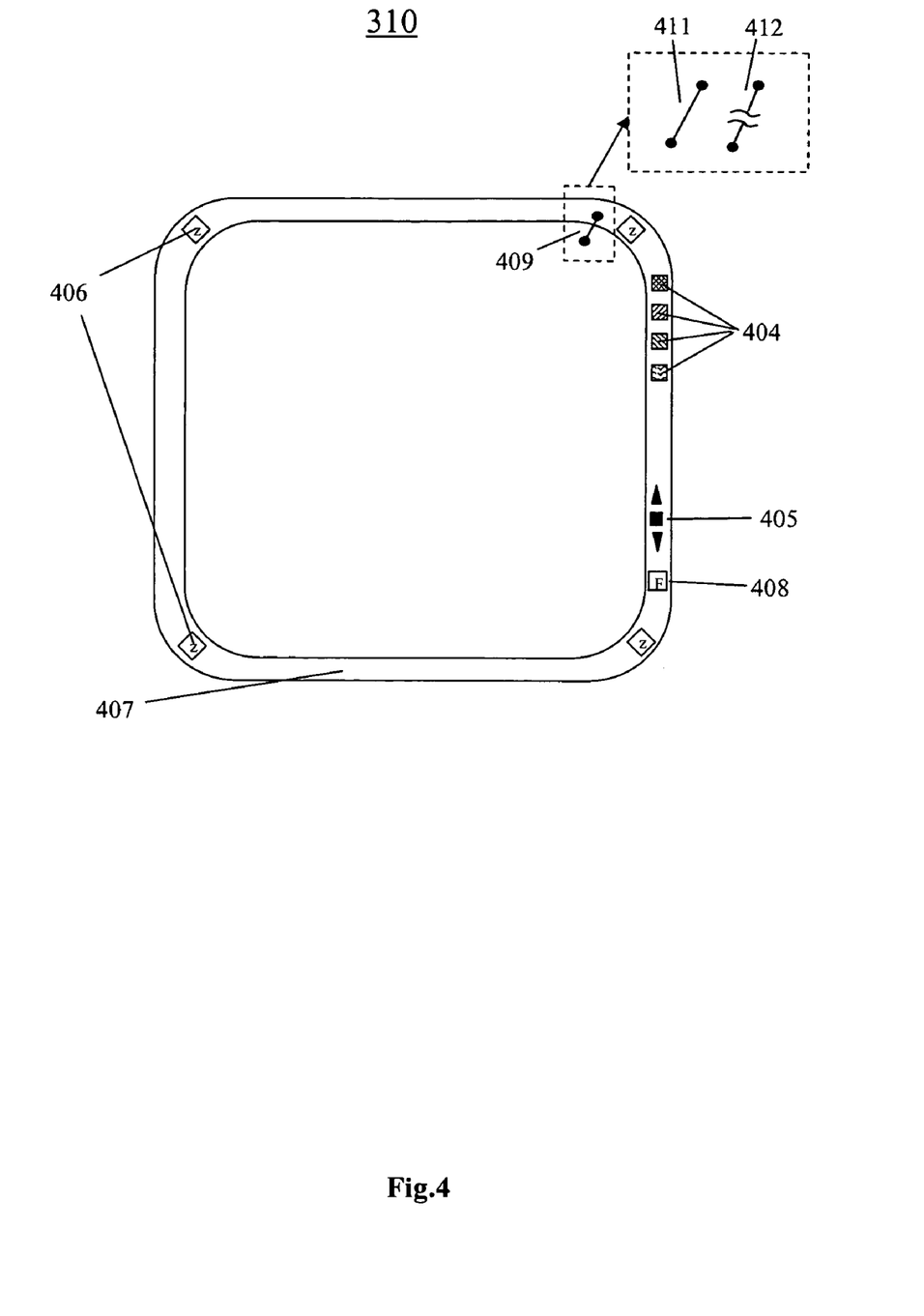
FIG. 4 shows a view of an exemplary 3D control panel having a plurality of buttons distributed, according to an embodiment of the present invention.

To use the 3D control panel 310 for data manipulation control, one or more buttons/switches may be present in/on the 3D control panel 310. FIG. 4 shows an exemplary configuration of various control buttons distributed on the 3D control panel 310, according to an embodiment of the present invention. This exemplary configuration comprises volume switching buttons 404, volume play control buttons 405, zoom/scale control buttons 406, a visual fusion control widget activation button 408, and a volume lock/unlock button 409. The volume switching buttons 404 enable a user to select one of a plurality of 3D volumes to be visualized in a rendering region (e.g., display region 105). The number of such buttons may correspond to the number of volumes in a particular 3D sequence. For example, if there are three volumes in a sequence, three volume switching buttons may be rendered, each of which corresponds to one volume, providing a selection means to allow a user to choose. A volume switching button may be implemented in such a way that a click may effectuate the selection of the associated 3D volume. Alternatively, a single volume switching button for all volumes may be used. A click on such a single switching button may activate a further selection mechanism such as popping up a selection list (of all volumes) and allow a user to make a selection from the selection list.

A volume play control button 405 is for controlling how a volume is to be played. Such type of buttons may have analogues to play control buttons for a VCR player. For example, a volume play control button can be a play button, a forward button, a fast forward button, a fast backward button, or a stop button. In some embodiments, means for controlling the volume play speed may also be provided. In addition, means for a user to manually flip through parallel cross sections of a 3D volume may also be provided. Such volume play control buttons assist a user to visualize data in a flexible manner as needed.

There may be one or more zoom control buttons 406 distributed around the 3D control panel 310. Having more than one such button may make it easier for a user to control zoom at a location closest to, for example, a mouse. When multiple zoom buttons are present, each of them may be designated for a specific display region. For example, one zoom button may be used for zooming the data rendered in the 3D rendering region (e.g., 105) and a different zoom button may be designated for a particular stack of cross sectional images. The arrangement of the zoom buttons may also be optimized such that each designated zoom button is closest to the region in which it is effective.

With the illustrated exemplary construct of the 3D control panel 310, a user may click on a panel area 407 in order to move the underlying plane. When the plane moves, it slices through different cross sections of the 3D volume and each of the cross sections may be visible on the plane during the motion. In this way, the user may, by a simple dragging operation on the 3D control panel, visually examine all the cross sections of the 3D volume in a direction perpendicular to the plane. When similar operations may be performed with respect to 3D control panels embedded in other planes, a user may examine cross sections of the 3D volume from different perspectives.

The volume lock/unlock button 409 may be used to control whether a 3D volume and the underlying plane are locked with each other. The volume lock/unlock button 409 may be implemented as a toggle, which has two alternate states: a locking state 411 and an unlocking state 412. When the volume lock/unlock button is in the locking state 411, a 3D volume rendered in the display region 105 is locked with the underlying plane. Under the locking state 411, the 3D volume and the plane(s) will always move simultaneously. For example, under a locking state, if a user drags the underlying plane, the 3D volume is dragged with it. In this case, the relative position of the 3D volume with respect to the plane does not change before and after the move and, therefore, 2D cross sectional images in all the stacks remain the same.

Under the unlocking state 412, a 3D volume and the underlying plane may move independent of each other. When independent movement occurs, the relative position of the 3D volume with respect to the plane changes so that the cross section visible on the plane changes as well. In some embodiments, the cross section cut by the plane may be updated on the fly while either is moving. In other embodiments, the cross section on the plane may be updated when the motion is completed (measured by, e.g., no movement within a specified period of time). In addition to the cross section on the plane, 2D cross section images in each of the stacks may also change when either the 3D volume or the plane moves. In some embodiments, 2D cross section images in the stacks may be updated on the fly while motion is still present. In other embodiments, 2D cross section images in the stacks may be updated when the motion is completed.

The locking/unlocking states may impact an operation activated by, for example, another button on the 3D control panel. For example, it may affect the zoom operation. Under the locking state 411, the 3D volume is bound to the frame of the plane or the 3D control panel. In this case, the effect of a zoom operation on a portion of the 3D volume may be to zoom in on the entire frame, including both the 3D volume as well as the plane/3D control panel. That is, under a locking state, a user may simply drag the border of the 3D control panel in order to create a zoom effect on the 3D volume. This differs from the effect from the same operation performed on the same portion of the 3D volume under the unlocking state, where, although the portion of the 3D volume is zoomed, the frame of the plane/3D control panel remains the same. Similar relations may hold with respect to a 3D volume's rotation or translation movement. If the 3D volume is locked with the 3D control panel's frame, when it is rotated/translated, the entire frame also rotates/translates.

The state of the locking/unlocking button may also limit a user's ability to move a plane through its embedded 3D control panel (by dragging on 407) to browse or scan different cross sections yielded by the moving plane. Such a capability may be enabled only when the 3D volume and the plane/3D control panel can move independent of each other. That is, the 3D control panel is set in an unlocking state.

The button 408 for activating one or more visual fusion control widgets may be used to facilitate a user's control over how information from different data sets is to be fused or integrated. Information to be integrated may include data itself or features thereof. In some situations, integration may be applied across different volumes. In other situations, integration may be applied across different cross sections, which may be from the same volume or different volumes. When the button 408 is activated, one or more visual fusion control widgets may be displayed at an appropriate location, for example, in the display region 105. Such an appropriate location may be pre-determined or adaptively determined where there is adequate display space for rendering the visual widget(s).

Figure 5:
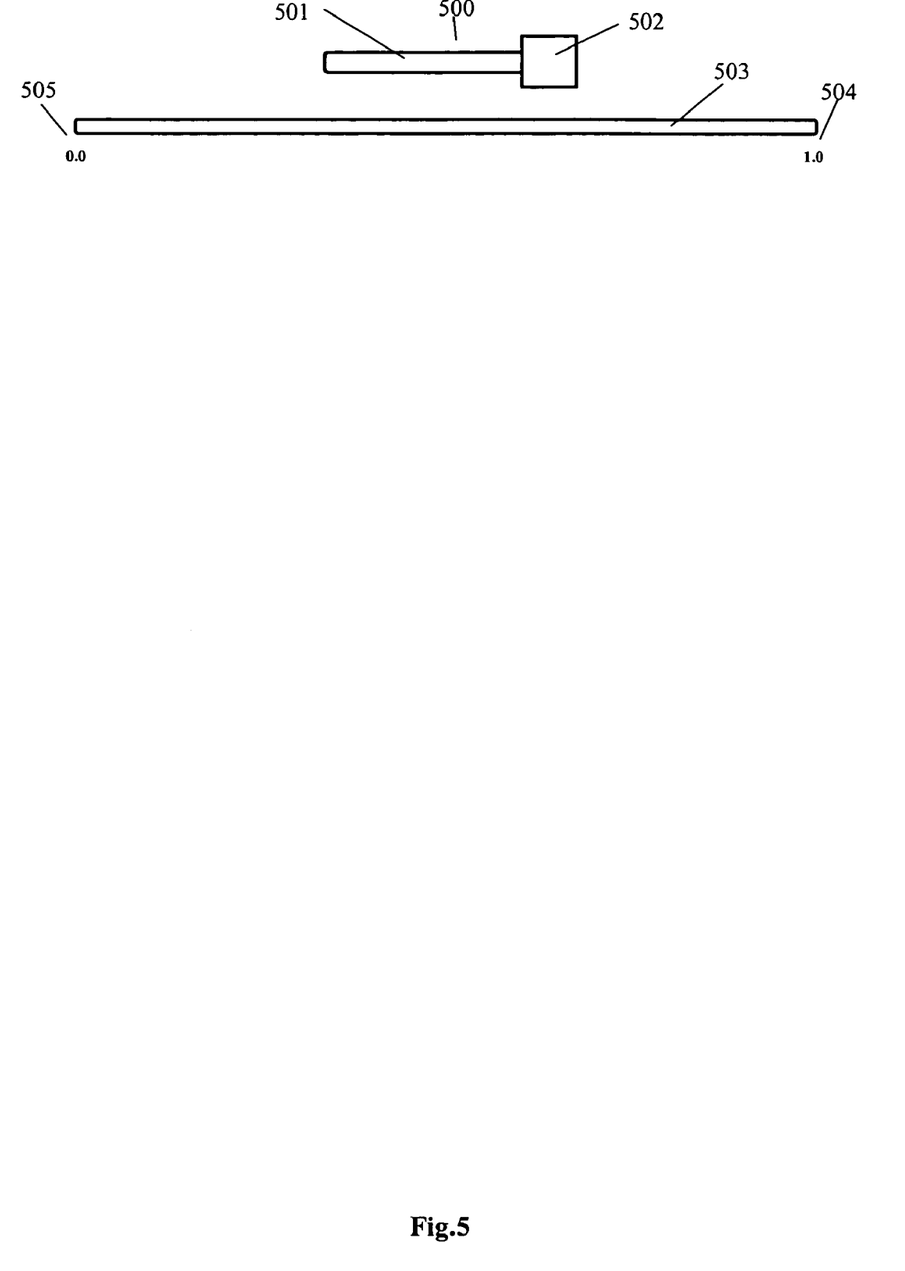
FIG. 5 shows components of an exemplary visual fusion control widget, according to an embodiment of the present invention.

A visual fusion control widget may be used to assign a weight to data from each of the data sets to be integrated or feature(s) thereof. Integration may take the form of a weighted sum across multiple data sets to derive fused information. All weights assigned to the integrated data sets may sum up to one or some value. FIG. 5 shows components of an exemplary visual fusion control widget, according to an embodiment of the present invention. Components of the exemplary visual fusion control widget include a weight factor handler 500, which comprises a bar segment 501 and a handle 502, and a sliding bar 503. The bar segment 501 of the weight factor handler 500 represents a weight value associated with the handle 502. The sliding bar 503 has two ends, 504 and 505, where one end may correspond to a lower bound of a weight value, e.g., zero, and the other corresponds to one or some value representing a summation of all weights. More than one weight factor handler may be aligned along the sliding bar 503, each of which may have its own bar segment corresponding to a different weight value.

Figure 6:
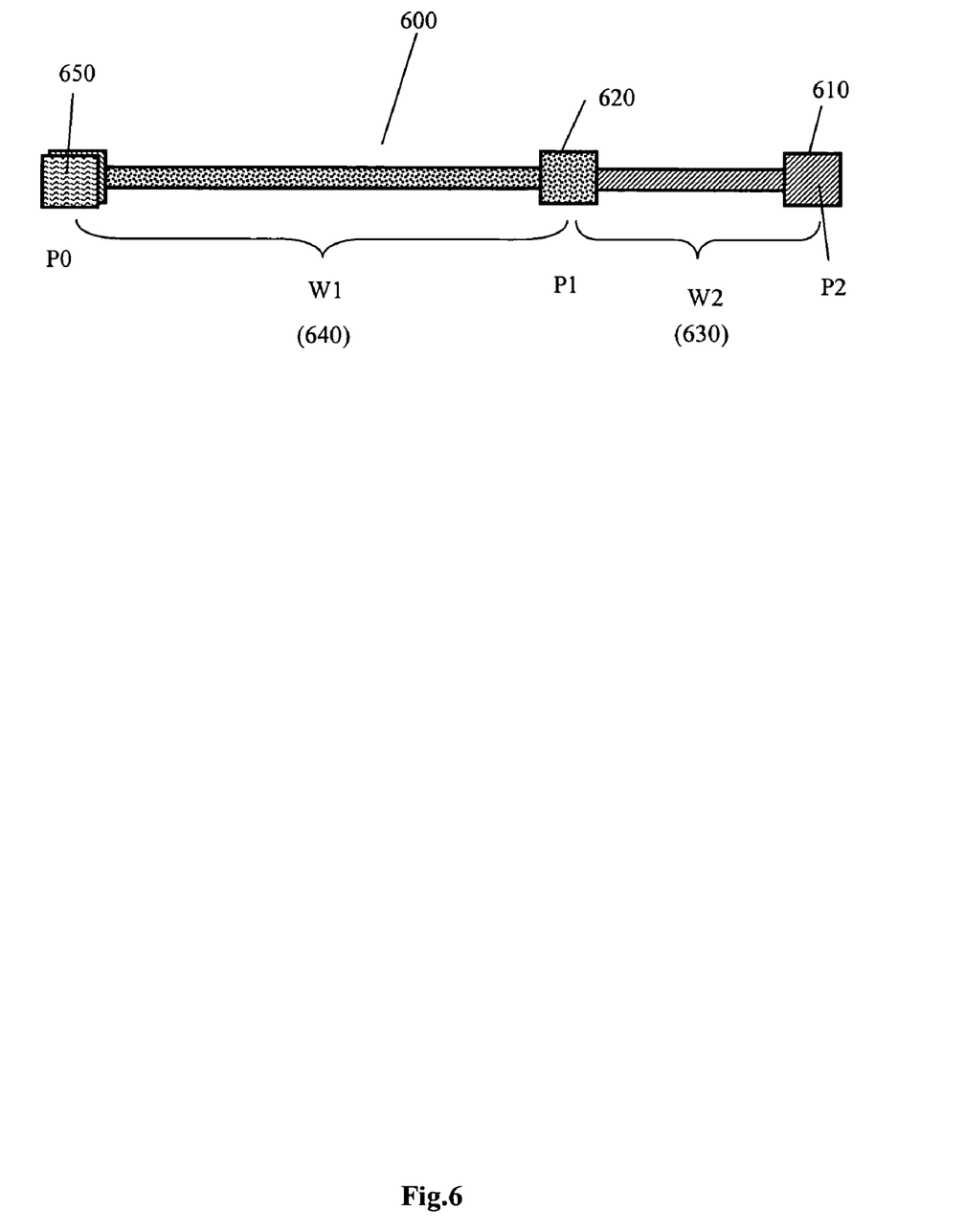
FIG. 6 illustrates an exemplary rendering of a visual fusion control widget, according to an embodiment of the present invention.

FIG. 6 illustrates an exemplary rendering of a visual fusion control widget 600, according to an embodiment of the present invention. On the exemplary visual fusion control widget 600, there is a plurality of handles positioned at different locations with respect to the sliding bar. A group of handles 650 are positioned at a location P0, which may correspond to the zero end of the sliding bar. A handle 620 is located at location P1 and another handle 610 is located at location P2. Each of the handles may be visualized using a different color and/or texture and can be slid along the sliding bar. In some embodiments, the total length of the sliding bar may correspond to a fixed value (e.g., one or some fixed value). In this case, a weight associated with a handle may be determined based on the distance between the handle and its nearest handle. For example, assuming from location P0 to location P2 constitutes the entire length of the underlying sliding bar, the distance between P0 and P1 is W1 and the distance between P1 and P2 is W2. A weight associated with handle 610 may be computed as W2/(W1+W2) and a weight associated with handle 620 may be computed as W1/(W1+W2), where W1+W2 is the fixed value associated with the sliding bar.

In some embodiments, the number of weight factor handlers rendered on a sliding bar may be adaptive. For example, it may be determined according to the number of data sets to be integrated. To produce a weight using the visual fusion control widget for each data set, a number of weight factor handlers may be initially located on the zero end of the sliding bar. A user may grab the handle of a weight factor handler and slide it along the sliding bar. In some embodiments, the sliding action is from left to right. The more the weight factor handler is slid to the right, the bigger the weight value is. When the bar segment on a weight factor handler has a non-zero length, it does not overlap with any other weight factor handler. When there is more than one weight factor handler of non-zero length on the sliding bar, whenever the position of a weight factor handler changes, e.g., the length of the bar segment increases or the weight increases, the positions of others may automatically be changed, e.g., the weights of others decrease, because the summation of all weights is a fixed value such as one. In a different embodiment, a sliding action may be from right to left. In some embodiments, the sliding action may be initiated from the zero end of the sliding bar. In other embodiments, the sliding action may be initiated from the other end. In either case, an appropriate computation of a weight associated with a weight factor handler may be devised accordingly.

Figure 7:
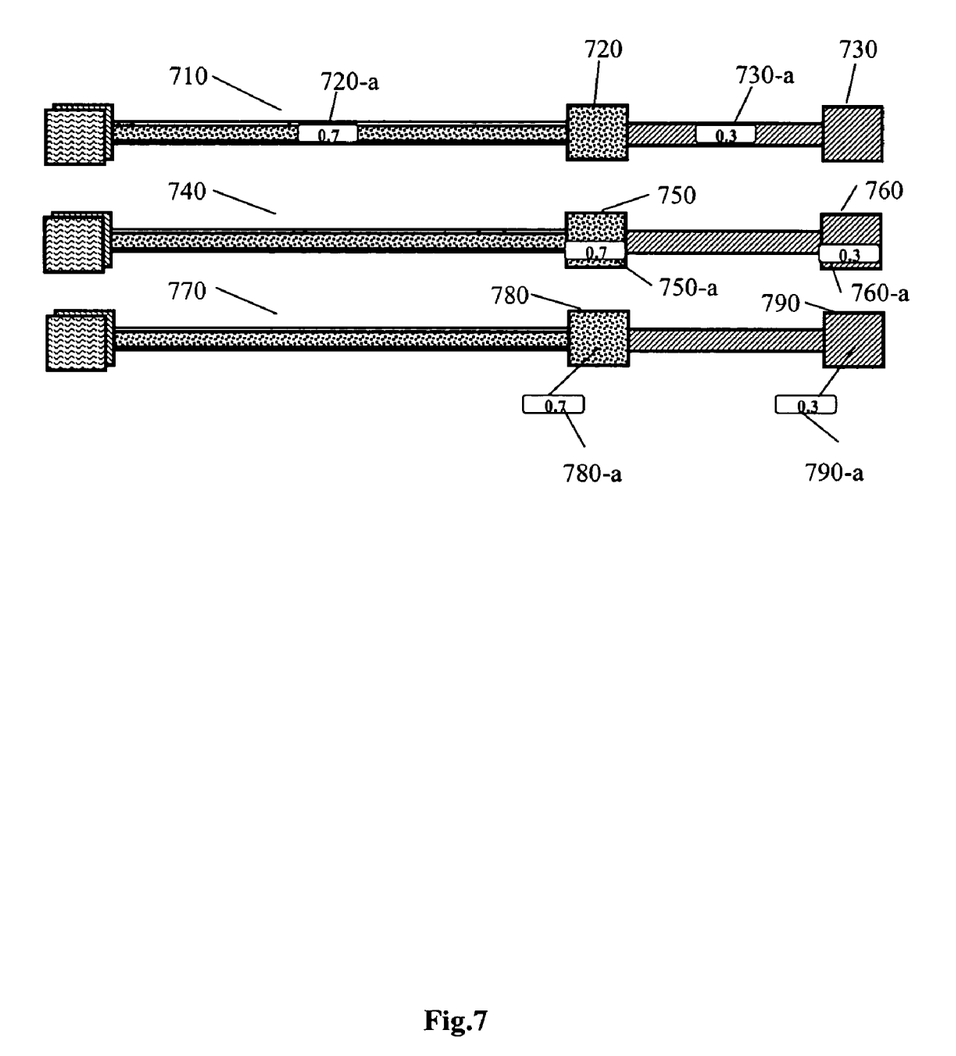
FIG. 7 shows multiple visual fusion control widgets with weights assigned to corresponding multiple data sets, according to an embodiment of the present invention.

When a weight factor handler is slid along the sliding bar, a weight value associated with its sliding position may be visualized. FIG. 7 shows exemplary means to visualize a weight derived via a visual fusion control widget, according to an embodiment of the present invention. On a first exemplary widget 710, a numeric value representing a weight associated with a handler is displayed on the bar segment of the handler (e.g., between the handle of the handler and its nearest neighboring handle towards, for example, the zero end of the sliding bar). For example, a weight associated with a weight factor handler 720 on the widget 710 is displayed at a location 720-a on the bar segment of the handler 720 (between the handler 720 and the zero end of the sliding bar). A weight associated with a handler 730 is displayed on the bar segment of the handler 730 at a location 730-a (between the handler 730 and the handler 720).

In a different embodiment, a weight associated with a weight factor handler may be displayed on the handle of the weight factor handler. For example, on an exemplary widget 740, a weight associated with a handler 750 is displayed on the handle 750-a of the handler 750 and a weight associated with a different handler 760 is displayed on the handle 760-a of the handler 760. In a yet another embodiment, a weight associated with a weight factor handler may be displayed as a callout from the handle of the handler. This is illustrated on a widget 770, where a weight associated with a handler 780 is displayed as a callout from the handle 780-a of the handler 780 and a weight associated with another handler 790 is displayed as a different callout from the handle 790-a of the handler 790.

Figure 8:
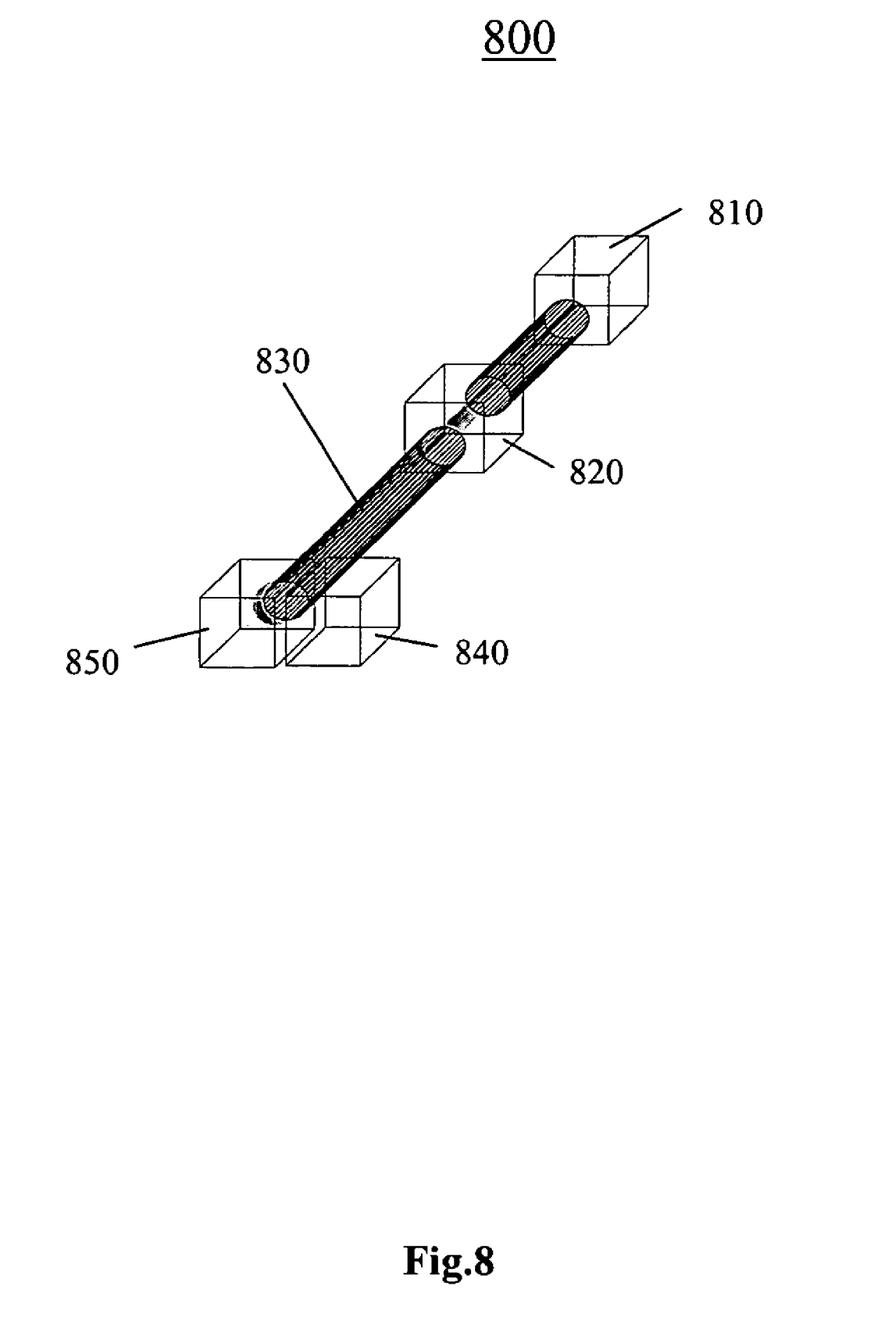
FIG. 8 shows an exemplary 3D visual fusion control widget, according to an embodiment of the present invention.

FIG. 8 shows a rendering of an exemplary 3D visual fusion control widget 800, according to an embodiment of the present invention. The exemplary 3D visual fusion control widget 800 comprises a plurality of 3D handles, 810, 820, ..., 840, and 850, and a 3D sliding bar 830. Each of the handles may slide along the 3D sliding bar 830, starting from one end of the 3D sliding bar and stopping at a certain location along the 3D sliding bar. A weight associated with a handle may be similarly determined and displayed based on methods as described herein. A weight may be displayed on the fly while a handle is sliding or after the sliding action comes to a stop.

Figure 9:
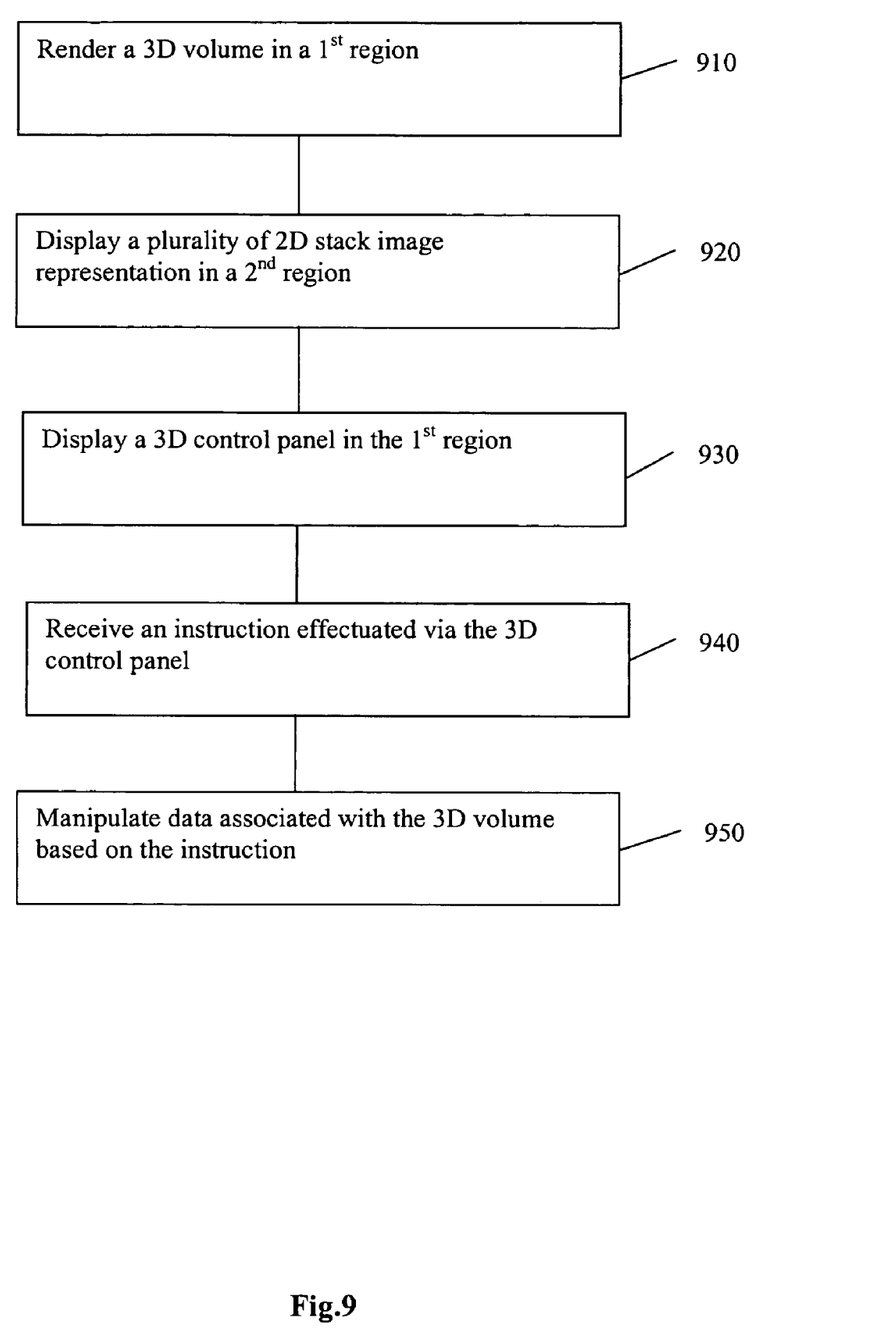
FIG. 9 is a flowchart of an exemplary process, in which 3D volumes are visualized and manipulated in a coherent manner via a 3D control panel, according to an embodiment of the present invention.

FIG. 9 is a high level flow of an exemplary process, in which volumetric data are visualized and manipulated in a coherent manner via a 3D control panel, according to an embodiment of the present invention. In this exemplary high level flow, a 3D volume is rendered, at 910, in a first region of a display area. In the first region, there may be one or more planes of different orientations that slice through the 3D volume and allow visualization of 2D views of different cross sections in some appearance mode. With respect to a plane in an opaque mode, 2D images of cross sections from different volumes are extracted, organized with respect to each volume, and displayed at 920 as stacks, each corresponding to one volume, in a second region of the display area. A 3D control panel may be rendered, at 930, with respect to a plane in the first region where the 3D control panel comprises one or more control buttons that are rendered on the 3D control panel at such locations and with such orientations so that they are visible with respect to a user's view. A user may perform an act on a button of the 3D control panel to effectuate different data manipulation operations. An instruction associated with an action performed via a button of the 3D control panel may be issued and received at 940. Based on the received instruction, a corresponding data manipulation operation is carried out at 950.

Figure 10:
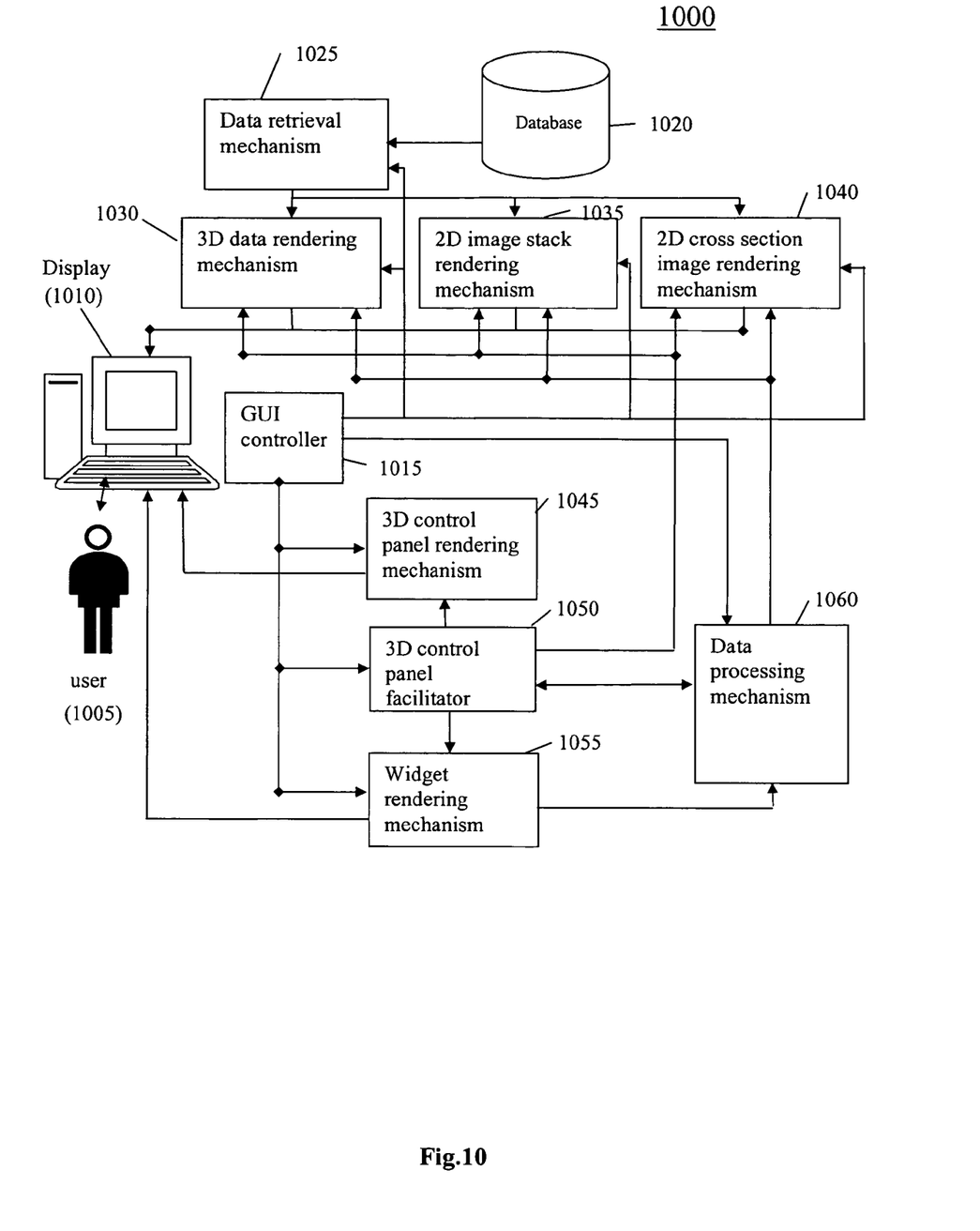
FIG. 10 depicts an exemplary construct of a system that facilitates 3D volume visualization and manipulation via a 3D control panel, according to an embodiment of the present invention.

FIG. 10 depicts an exemplary construct of a system 1000 that facilitates data manipulation via a 3D control panel, according to an embodiment of the present invention. The system 1000 comprises a display device 1010, a graphical user interface (GUI) controller 1015, a database 1020, a data retrieval mechanism 1025, a plurality of rendering mechanisms (a 3D data rendering mechanism 1030, a 2D image stack rendering mechanism 1035, and a 2D cross section image rendering mechanism 1040, a 3D control panel rendering mechanism 1045, and a widget rendering mechanism 1055), a 3D control panel facilitator 1050, and a data processing mechanism 1060. A user 1005 may interact with the system 1000 via a user interface displayed on the display device 1010. The GUI controller 1015 may control the interaction between the system 1000 and the user 1005. When the user 1005 desires to visualize certain data, the GUI controller 1015, upon receiving such a request, activates the data retrieval mechanism 1025 to retrieve desired data from the database 1020. Depending on the nature of the retrieved data and/or the user's preference, one or more data rendering mechanisms may be invoked to render the retrieved data o the display device 1010. Data rendering may be carried out dynamically and data to be rendered may also change. For example, when the user 1005 rotates a 3D volume, the original rendering may need to be updated to reflect the change in appearance of the data due to the rotation. Accordingly, due to the rotation, 2D cross sections to be rendered may also change.

The data rendering mechanisms (1030, 1035, and 1040) may perform not only data rendering but also determine on the fly what data needs to be accessed, processed, and displayed based on information from the GUI controller 1015. In some situations, when certain processing is applied to data, e.g., by the data processing mechanism 1060, the processed data may also need to be re-rendered to reflect the data processing result. In other situations, an action taken on the 3D control panel may result in the need to re-render data. For instance, when the user 1005 hits a zoom button to zoom in on a portion of a 3D volume, it requires re-rendering of that portion of the 3D volume.

The 3D control panel rendering mechanism 1045 may be responsible for rendering a 3D control panel on the display device 1010. It may be invoked in different situations. For example, whenever the 3D control panel rotates with a moving plane, re-rendering may be needed. In addition, the 3D control panel rendering mechanism 1045 is capable of determining how buttons on the 3D control panel are to be rendered so that such buttons are visible to the user 1005 regardless of the orientation of the 3D control panel.

The 3D control panel facilitator 1050 may be responsible for effectuating different operational requests issued by the user 1005 through various buttons on the 3D control panel. When such a request is received from the GUI controller 1015, the 3D control panel facilitator 1050 determines which part(s) of the system 1000 can carry out the request and then invoke such parts. For example, when a button for activating the visual fusion control widget is pressed, the 3D control panel facilitator 1050, upon receiving such information from the GUI controller 1015, may accordingly invoke the widget rendering mechanism 1055 to render a visual fusion control widget and to interact with the user 1005 to derive weights and assign them to different data sets. In some situations, the user 1005 may also request certain data processing to be performed on data via the 3D control panel. When the request is received, the 3D control panel facilitator may invoke the data processing mechanism to carry out the desired processing.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method for manipulating 4D data, comprising:
   rendering a first 3D volume in a 3D rendering region;
   displaying a plurality of representations, each representation signifying a stack of 2D images, wherein
   a first stack comprises one or more 2D images of cross sections of a certain orientation from the first 3D volume, and
   each of the other stacks comprises one or more 2D images of cross sections of a different orientation from the first 3D volume, and
   the first 3D volume is selected from a plurality of 3D volumes comprising the 4D data.

2. The method according to claim 1, wherein:
   a 2D image on top of the first stack corresponds to a cross section from the first volume at a certain location and with the certain orientation; and
   a 2D image on top of each of the other stacks corresponds to a cross section at the certain location of the 3D volume with a different orientation.

3. The method according to claim 1, wherein 2D cross section images in the first stack are obtained by slicing the first 3D volume using a slicing plane along a direction determined based on the certain orientation.

4. The method according to claim 3, wherein a plurality of orthogonal slicing planes are displayed in the 3D rendering region.

5. The method according to claim 4, wherein each of the slicing planes is displayed in one of an opaque appearance mode, a transparent appearance mode, and an invisible appearance mode.

6. The method according to claim 5, wherein a slicing plane in a transparent appearance mode is visualized using a color tone.

7. The method according to claim 1, wherein each representation of a stack of 2D images can be un-stacked so that one or more 2D images from the stack are displayed in full view.

8. The method according to claim 7, wherein the un-stacked 2D images are displayed in the 3D rendering region.

9. The method according to claim 7, wherein when the un-stacked 2D images are displayed in the 3D rendering region and the first 3D volume is rendered in a different region where the 2D image stack was displayed.

10. The method according to claim 3, further comprising embedding a 3D control structure with respect to the slicing plane, wherein the 3D control structure is provided for manipulating the 4D data and its associated 3D volumes.

11. The method according to claim 10, wherein the embedded 3D control structure is configured along a border of the slicing plane.

12. The method according to claim 11, wherein the 3D control structure embedded with respect to the slicing plane is rendered as a three dimensional cylinder.

13. The method according to claim 10, wherein the 3D control structure comprises one or more buttons, each of which is associated with a function and/or an operation and can be pressed to activate its associated function and/or operation.

14. The method according to claim 11, wherein the slicing plane embedding the 3D control structure can be moved through moving the 3D control structure panel.

15. The method according to claim 13, wherein positions of the one or more buttons on the 3D control structure are dynamically adjusted when the 3D control structure moves so that the one or more buttons remain visible.

16. The method according to claim 13, wherein the one or more buttons include at least one of:
   at least one button configured to select a 3D volume to be visualized;
   at least one button configured to activate zooming/scaling control with respect to the 3D volume to be visualized;
   a button configured to lock/unlock a 3D volume with a slicing plane that intersects the 3D volume;
   at least one button configure to control volume play; and
   a button for activating a visual fusion control widget.

17. The method according to claim 16, wherein a button for controlling volume play includes one of a play button, a fast forward button, and a fast backward button.

18. The method according to claim 16, wherein a visual fusion control widget is displayed as a 2D planar object.

19. The method according to claim 16, wherein a visual fusion control widget is displayed as a 3D object.

20. The method according to claim 16, wherein the visual fusion control widget comprises:
   a plurality of weight factor handlers, each of which is associated with an underlying data set and is used to derive a weight to be assigned to the underlying data set in order to fuse with data set associated with other weight factor handlers; and
   a sliding bar on which each of the weight factor handler slides in order to determine a weight based on a relative position with respect to the sliding bar.

21. The method according to claim 20, wherein the data set associated with a weight factor handler is a 3D volume.

22. The method according to claim 20, wherein the data set associated with a weight factor handler is a 2D image.

23. The method according to claim 21, wherein the data set associated with a weight factor handler comprises one or more features.

24. The method according to claim 22, wherein the data set associated with a weight factor handler is a 2D image of a cross section of the 3D volume.

25. The method according to claim 16, wherein each of the weight factor handlers is displayed using a different color and/or texture.

26. The method according to claim 16, wherein each weight factor handler comprises a handle and a bar segment, the handle being used to slide on the sliding bar and the length of the bar segment is used to determine the weight.

27. The method according to claim 26, wherein a numeric value representing the weight associated with the weight factor handler is displayed on the bar segment of the weight factor handler.

28. The method according to claim 27, wherein a numeric value representing the weight associated with the weight factor handler is displayed on the handle of the weight factor handler.

29. The method according to claim 27, wherein the numeric value representing the weight assigned is displayed nearby the handle of the weight factor handler.

30. A method for providing 3D control, comprising:
generating a 3D construct;
embedding the 3D construct with respect to a 3D slicing plane in a 3D rendering space on a 2D display region, wherein
the 3D construct has one or more buttons rendered in such a way that the one or more buttons are visible, and
the 3D construct with the one or more buttons are provided for manipulating, in the 3D rendering space, at least one 3D volume.

31. The method according to claim 30, wherein:
at least a portion of the 3D construct is a three dimensional cylinder; and
each of the one or more buttons is associated with a function and/or operation and can be pressed to activate the associated function and/or operation.

32. The method according to claim 30, wherein positions of the one or more buttons with respect to the 3D construct are dynamically adjustable when the 3D construct moves so that the one or more buttons remain visible.

33. The method according to claim 30, wherein the 3D slicing plane can be moved by moving the 3D construct.

34. A method for manipulating 4D data, comprising:
rendering a first 3D volume in a 3D rendering space where there is at least one 3D slicing plane, each of which has a certain orientation and intersects the first 3D volume in the 3D rendering space;
embedding a 3D control structure in the 3D rendering space with respect to one of the 3D slicing planes, wherein
the 3D control structure comprises one or more buttons, each of which is associated with a function and/or an operation for manipulating the 4D data comprising a plurality of 3D volumes and can be pressed to activate its associated function and/or operation.

35. The method according to claim 34, wherein at least a portion of the 3D control structure is a three dimensional cylinder.

36. The method according to claim 34, wherein the 3D slicing plane embedding the 3D control structure can be moved with the 3D control structure.

37. The method according to claim 34, wherein positions of the one or more buttons with respect to the 3D control structure can be dynamically adjusted when the 3D control structure moves so that the button remains visible.

38. The method according to claim 34, wherein the one or more buttons include at least one of:
at least one button configured to select a 3D volume to be visualized;
at least one button configured to activate zooming/scaling control with respect to the 3D volume to be visualized;
a button configured to lock/unlock a 3D volume with a 3D plane that slices the 3D volume to be visualized;
at least one button configure to control volume play; and
a button for activating a visual fusion control widget.

39. The method according to claim 38, wherein a volume play control button includes one of a play button, a fast forward button, and a fast backward button.

40. The method according to claim 38, wherein the visual fusion control widget is displayed as one of a 2D planar object and a 3D object.

41. The method according to claim 38, wherein the visual fusion control widget comprises:
a plurality of weight factor handlers, each of which is associated with an underlying data set and is used to derive a weight to be assigned to the underlying data set in order to fuse with data set associated with other weight factor handlers; and
a sliding bar on which each of the weight factor handler slides in order to determine a weight based on a relative position with respect to the sliding bar.

42. The method according to claim 41, wherein the data set associated with each weight factor handler is one of a 3D volume, a 2D image, and one or more features thereof.

43. The method according to claim 38, wherein each of the weight factor handlers is used to assign a weight to its associated data set.

44. The method according to claim 38, wherein each weight factor handler is displayed using a different color and/or texture.

45. The method according to claim 38, wherein each weight factor handler comprises a handle and a bar segment, the handle being used to slide on the sliding bar and the length of the bar segment is used to determine the weight.

46. The method according to claim 45, wherein a numeric value representing the weight associated with the weight factor handler is displayed on the bar segment of the weight factor handler.

47. The method according to claim 45, wherein a numeric value representing the weight associated with the weight factor handler is displayed on the handle of the weight factor handler.

48. The method according to claim 45, wherein the numeric value representing the weight assigned is displayed nearby the handle of the weight factor handler.

49. A 3D control structure, comprising:
a 3D construct configured to be embedded with respect to a 3D slicing plane in a 3D rendering space; and
one or more buttons distributed on the 3D construct, wherein
the one or more buttons are positioned with respect to the 3D construct in a manner so that they are visible regardless of the orientation of the 3D construct and can be used to manipulate a 3D volume rendered in the 3D rendering space.

50. The 3D control structure according to claim 49, wherein at least a portion of the 3D construct is a three dimensional cylinder.

51. The 3D control structure according to claim 49, wherein each of the buttons is associated with a function and/or an operation for manipulating data associated with the 3D volume rendered in the 3D rendering space and can be pressed to activate its associated function and/or operation.

52. The 3D control structure according to claim 49, wherein the 3D slicing plane can be moved by moving the 3D construct.

53. The 3D control structure according to claim 52, wherein positions of the one or more buttons with respect to the 3D construct are dynamically adjusted when the 3D construct moves so that the one or more buttons remain visible.

54. A system for manipulating 4D data, comprising:
a 3D data rendering mechanism configured to render a first 3D volume in a 3D rendering region; and a 2D image stack rendering mechanism configured to display a plurality of representations, each of the representations signifying a stack of 2D images, wherein
a first stack comprises one or more 2D images of cross sections with a certain orientation from the first 3D volume, and
each of the other stacks comprises one or more 2D images of cross sections of a different orientation from the first 3D volume and
the first 3D volume is selected from a plurality of 3D volumes comprising the 4D data.

55. The system according to claim 54, wherein the first 3D volume and the one or more representations are visualized in different rendering regions.

56. The system according to claim 54, wherein the certain orientation of is determined with respect to a 3D slicing plane that intersects the first 3D volume in the 3D rendering region.

57. The system according to claim 54, further comprising a 2D cross section image rendering mechanism configured to display one or more 2D images of cross sections from one of the stacks in a display region.

58. The system according to claim 57, wherein the 2D cross section image rendering mechanism displays a 2D image in a sub-region of the specified display region with a size determined based on a location of the sub-region.

59. The system according to claim 56, further comprising:
a 3D control structure rendering mechanism capable of:
embedding a 3D control structure with respect to the 3D slicing plane; and
rendering one or more buttons on the 3D control structure panel in such a manner that the one or more buttons are visible regardless of the orientation of the 3D control structure, wherein
the 3D control structure is for manipulating the first 3D volume and its associated 3D volumes.

60. The system according to claim 59, wherein the one or more buttons include at least one of:
at least one button configured to select a 3D volume to be visualized;
at least one button configured to activate zooming/scaling control with respect to the 3D volume visualized;
a button configured to lock/unlock a 3D volume with the 3D plane that slices the 3D volume;
at least one button configure to control volume play; and
a button for activating a visual fusion control widget.

61. The system according to claim 59, wherein the 3D control structure rendering mechanism displays the 3D control structure along a border of the 3D slicing plane.

62. The system according to claim 61, wherein:
at least a portion of the 3D control structure is rendered as a three dimensional cylinder; and
each of the one or more buttons is associated with a function and/or operation and can be pressed to activate the associated function and/or operation.

63. The system according to claim 61, wherein the 3D control structure rendering mechanism is further capable of dynamically adjusting positions of the one or more buttons with respect to the 3D control structure when the 3D control structure moves so that the buttons remain visible.

64. The system according to claim 59, further comprising a visual widget rendering mechanism configured to render the visual fusion control widget when the button for activating the visual fusion control widget is pressed.

65. The system according to claim 59, further comprising a 3D control structure facilitator configure to effectuate a function and/or operation associated with each of the buttons when the button is activated.

66. A system for data manipulation, comprising:
a 3D data rendering mechanism configured to render a first 3D volume in a 3D rendering area; and
a 3D control structure rendering mechanism capable of:
rendering a 3D control structure in the 3D rendering area;
rendering one or more buttons on the 3D control structure in such a way that the one or more buttons are visible, wherein
the 3D control structure is for manipulating the first 3D volume and its associated 3D volumes.

67. The system according to claim 66, wherein the 3D control structure rendering mechanism embeds the 3D control structure with respect to a 3D slicing plane intersecting the first 3D volume in the 3D rendering area.

68. The system according to claim 67, wherein:
the 3D control structure is rendered as a three dimensional cylinder along the border of the 3D slicing plane; and
each of the one or more buttons is associated with a function and/or operation for manipulating the first 3D volume and its associated 3D volumes and can be pressed to activate the associated function and/or operation.

69. The system according to claim 68, wherein the 3D control structure rendering mechanism is further capable of dynamically adjusting positions of the one or more buttons with respect to the 3D control structure when the 3D control structure moves so that the one or more buttons remain visible.

70. The system according to claim 69, wherein the 3D plane intersecting the first 3D volume can be moved by moving the 3D control structure.

71. The system according to claim 66, further comprising a 3D control structure facilitator configure to effectuate a function and/or operation associated with each of the buttons when the button is activated.

72. A visual control widget, comprising:
a plurality of weight factor handlers; and
a sliding bar, wherein
each of the weight factor handler is capable of being slid on the sliding bar, and
a value determined based on a position of each weight factor handler on the sliding bar is displayed on the visual control widget.

73. The widget according to claim 72, wherein the visual control widget is rendered as a 2D planar object.

74. The widget according to claim 72, wherein the visual control widget is rendered as a 3D object.

75. The widget according to claim 72, wherein each of the weight factor handler is rendered using a color and/or texture.

76. The widget according to claim 72, wherein the value is displayed on visual control widget is rendered using a texture.

77. The widget according to claim 72, wherein a weight factor handler comprises:
a handle; and
a bar segment, wherein the handle is used to slide on the sliding bar and the length of the bar segment relates to the value associated with the weight factor handler.

78. The widget according to claim 77, wherein the value associated with a weight factor handler is displayed at least one of:
on the bar segment of the weight factor handler;

on the handle of the weight factor handler; and
near the handle of the weight factor handler.

79. A method for 3D data manipulation, comprising:

rendering a 3D volume in a 3D rendering region of a 2D display;

rendering a plurality of 3D slicing planes in the 3D rendering region; and displaying a plurality of representations in a 2D display region, each representation signifying a stack of 2D cross section images, wherein the plurality of 3D slicing planes intersect with each other and with the 3D volume at a certain location of the 3D rendering region, the plurality of 3D slicing planes are orthogonal to each other, each of the stacks comprises one or more 2D cross section images obtained by slicing a respective 3D slicing plane of the plurality of 3D slicing planes through the 3D volume in a direction normal to the orientation of the respective 3D slicing plane.

80. A method for 3D data manipulation, comprising:

rendering a 3D volume in a 3D rendering region of a 2D display;

rendering a plurality of 3D slicing planes in the 3D rendering region; and embedding a 3D control structure with respect to one of the 3D slicing planes, wherein the 3D slicing planes intersect with each other and with the 3D volume at a certain location of the 3D rendering region, the 3D control structure is for manipulating the 3D volume or the 3D slicing planes in the 3D rendering region.

* * * * *